US010624256B2

(12) United States Patent
Carr et al.

(10) Patent No.: US 10,624,256 B2
(45) Date of Patent: Apr. 21, 2020

(54) METHOD OF OPERATING A PLANTER FOR PLANTING SEEDS IN A FIELD FOR EXPERIMENTAL PURPOSES

(71) Applicant: GARY W. CLEM, INC., Nevada, IA (US)

(72) Inventors: Brian W. Carr, Ames, IA (US); Andrew G. Jenkins, Nevada, IA (US); Curtis R. Hammer, Ankeny, IA (US); Scott A. Sporrer, Nevada, IA (US); Nick Merfeld, Nevada, IA (US); Marcus D. Woster, Roland, IA (US)

(73) Assignee: Gary W. Clem, Inc., Nevada, IA (US)

( * ) Notice: Subject to any disclaimer, the term of this patent is extended or adjusted under 35 U.S.C. 154(b) by 336 days.

(21) Appl. No.: 14/138,367

(22) Filed: Dec. 23, 2013

(65) Prior Publication Data

US 2014/0121910 A1    May 1, 2014

Related U.S. Application Data

(63) Continuation of application No. 11/934,242, filed on Nov. 2, 2007, now abandoned.

(51) Int. Cl.
*A01C 14/00* (2006.01)
*A01B 79/00* (2006.01)
*A01C 21/00* (2006.01)

(52) U.S. Cl.
CPC .......... *A01C 14/00* (2013.01); *A01B 79/005* (2013.01); *A01C 21/005* (2013.01)

(58) Field of Classification Search
CPC ........ A01C 7/046; A01C 7/105; A01B 79/005

USPC ........................................................ 701/50
See application file for complete search history.

(56) References Cited

U.S. PATENT DOCUMENTS

| 4,277,833 | A | * | 7/1981 | Steffen | ................... A01C 7/105 221/8 |
|---|---|---|---|---|---|
| 4,653,410 | A |   | 3/1987 | Typpi |  |
| 5,621,666 | A |   | 4/1997 | O'Neall et al. |  |
| 5,915,313 | A |   | 6/1999 | Bender et al. |  |
| 6,003,455 | A |   | 12/1999 | Flamme et al. |  |
| 6,079,340 | A |   | 6/2000 | Flamme et al. |  |
| 6,089,743 | A | * | 7/2000 | McQuinn | ............. A01B 79/005 111/130 |
| 6,091,997 | A | * | 7/2000 | Flamme | ............... A01B 79/005 111/903 |
| 6,176,393 | B1 |   | 1/2001 | Luxon |  |
| 6,386,128 | B1 | * | 5/2002 | Svoboda | ............. A01B 79/005 111/200 |

(Continued)

OTHER PUBLICATIONS

Seed Research Equipment Solutions; Rev.: Nov. 23, 2005; pp. 1-8; Precision Vacuum Planters; USA.

(Continued)

*Primary Examiner* — Robert E Pezzuto
*Assistant Examiner* — Joel F. Mitchell
(74) *Attorney, Agent, or Firm* — Zarley Law Firm, PLC

(57) ABSTRACT

A method of operating a planter where plot characteristics are input into a controller that is associated with a planter. A distance measuring device associated with the controller senses ground speed and distance traveled and transmits the sensed information to the controller. The controller then automatically adjusts the rotational speed of a seed plate of a row planter mounted to the planter based upon the sensed information to achieve the input plot characteristics.

9 Claims, 2 Drawing Sheets

(56) References Cited

U.S. PATENT DOCUMENTS

| | | | |
|---|---|---|---|
| 6,553,312 B2 | 4/2003 | Upadhyaya et al. | |
| 6,626,120 B2* | 9/2003 | Bogner | A01C 7/046 |
| | | | 111/185 |
| 6,644,225 B2 | 11/2003 | Keaton | |
| 6,718,891 B1* | 4/2004 | Burbage, Jr. | A01C 7/042 |
| | | | 111/177 |
| 6,941,225 B2 | 9/2005 | Upadhyaya et al. | |
| 7,451,713 B2 | 11/2008 | Mariman et al. | |
| 7,478,603 B2* | 1/2009 | Riewerts | A01C 7/046 |
| | | | 111/200 |
| 7,717,048 B2 | 5/2010 | Peterson, Jr. et al. | |
| 7,726,251 B1 | 6/2010 | Peterson et al. | |
| 7,925,404 B2 | 4/2011 | Dillman | |
| 2006/0106535 A1* | 5/2006 | Duncan et al. | A01B 79/005 |
| | | | 701/532 |

OTHER PUBLICATIONS

Computrol—Seed Placement Monitor; Nov. 6, 2007; pp. 1-5; Big John Manufacturing—Ag Electronics; Osmond, Nebraska USA.

\* cited by examiner

METHOD OF OPERATING A PLANTER FOR PLANTING SEEDS IN A FIELD FOR EXPERIMENTAL PURPOSES

CROSS REFERENCE TO A RELATED APPLICATION

This application is a continuation of U.S. Ser. No. 11/934,242 filed Nov. 2, 2007.

BACKGROUND OF THE INVENTION

This invention is directed toward a method of operating a planter and more specifically a method of operating a planter for planting seeds in a field for experimental purposes.

Planters for seed research plots are used to plant seeds from different seed groups in a short row segment. Presently a control system is used to assist in planting research plots that is difficult to calibrate for accuracy and is limited in the information that is stored. For example, to calibrate existing planters an operator inputs various planting characteristics into the controller such as plot and alley length and the number of cells on a plate. The operator then performs a test run and makes observations as to whether the plot start and stop points are the same as those desired. Based on the observations the operator adjusts the information that is input into the controller to compensate for the acceleration and deceleration of the seed plate as it relates to the ground speed of the planter. This process is repeated until the desired plot and alley lengths are obtained which takes an experienced operator approximately an hour and an inexperienced operator up to a half day.

Should changes be made such as the plot length or the size of the seed plate the entire process must be repeated. Therefore, there exists a need in the art for a system that addresses these deficiencies.

A principal objective of the present invention is to provide a method that reduces the time required for calibrating a planter.

Another objective of the present invention is to provide a method that is more versatile to changes in planting conditions.

These and other objectives, features, and advantages of the present invention will become apparent from the specification and claims.

BRIEF SUMMARY OF THE INVENTION

A method of operating a planter where plot characteristics are input into a controller that is associated with a planter. A distance measuring device associated with the controller senses ground speed and distance traveled and transmits the sensed information to the controller. The controller then automatically adjusts the rotational speed of a seed plate of a row planter mounted to the planter based upon the sensed information to achieve the input plot characteristics.

DETAILED DESCRIPTION OF THE PREFERRED EMBODIMENT

Figure 1:
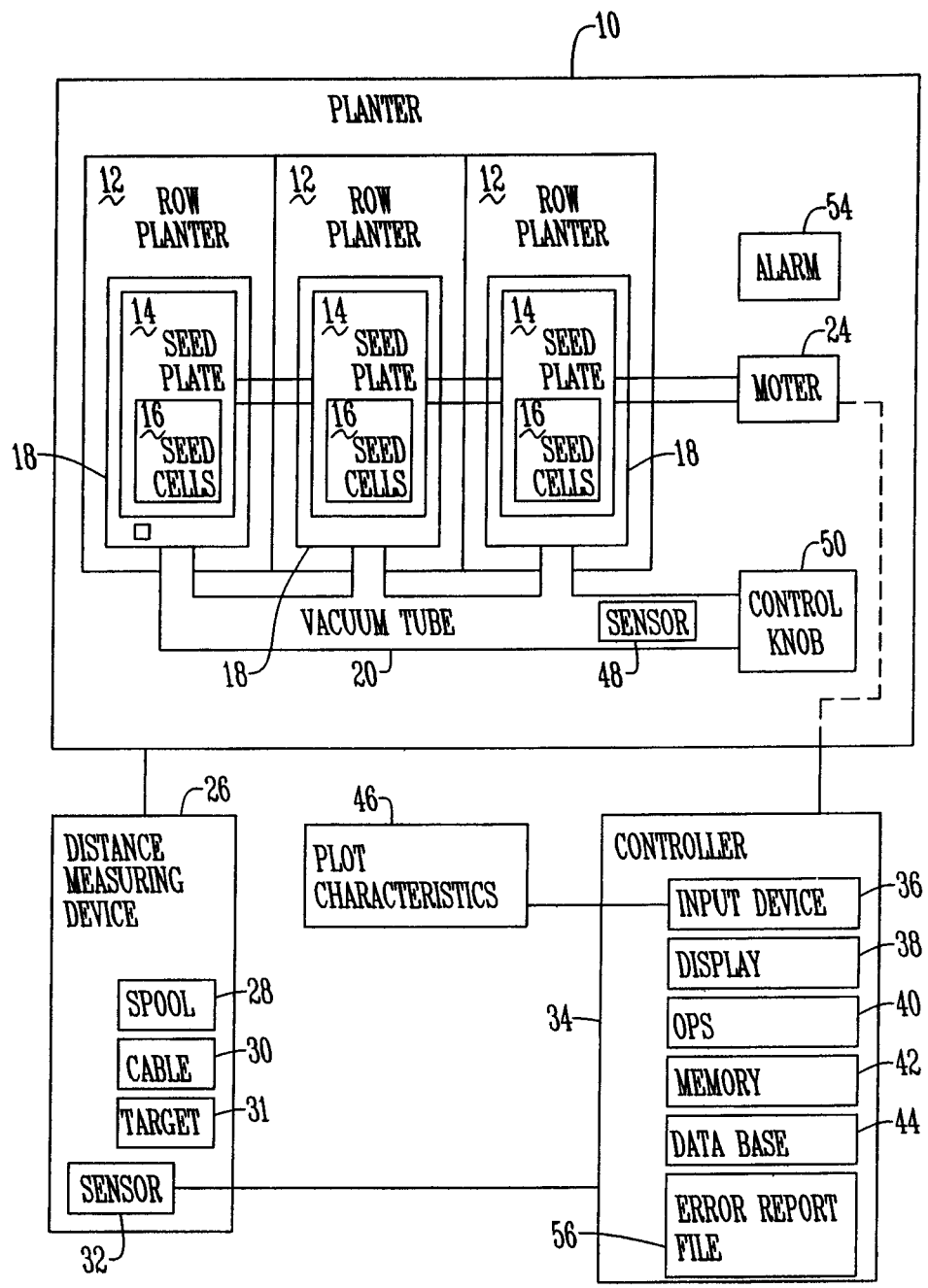
FIG. 1 is a schematic view of the working environment of a method for operating a planter.
Figure 2:
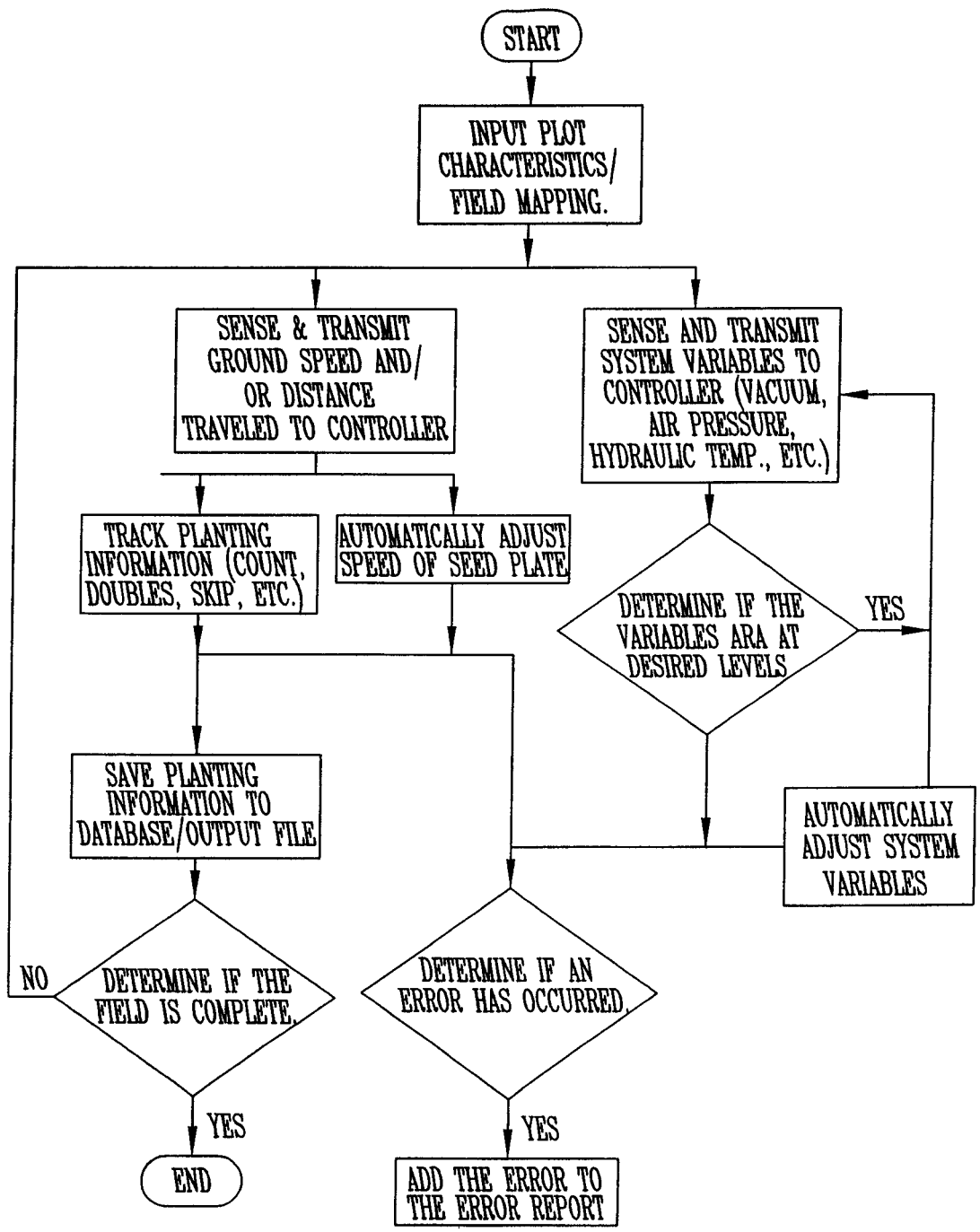
FIG. 2 is a flow diagram of a method of operating a planter.

A planter 10 for planting seeds in a field for experimental purposes has a plurality of row planters 12 that drop seed to the ground. The row planters 12 have a seed plate 14 with a plurality of seed cells 16. The seed plate 14 is contained within a housing 18 with a vacuum tube 20 in communication with the interior of the housing 18 to create a vacuum pressure to maintain a seed within a cell 16 on the seed plate 14. The seed plate 14 is rotatably mounted to and driven by a drive shaft of a motor 24.

A distance measuring device 26 is used in association with the planter 10. The distance measuring device 26 is of any conventional type such as a spool and cable, GPS, radar, or sonar, and is mounted either to the planter 10 or the tractor that pulls the planter. In one example the distance measuring device includes a spool 28 having a cable 30 with a plurality of targets 31 attached thereto. At least one or more sensors 32 are mounted either on the planter 10 or the tractor to sense the speed of travel and the target to sense the distance traveled.

Both the row planters 12 and the distance measuring device 26 are connected to a controller 34 either by an electrical or wireless connection. The controller receives signals from the sensors to calculate the speed of travel and the distance that the planter 10 travels and also controls the rotational speed of the seed plate 14 through the hydraulic motor 24. The controller 34 has an input device 36, a display 38, and operating system 40, a memory 42, and a database 44.

To calibrate the planter 10 an operator inputs information concerning plot characteristics 46. Plot characteristics include, but are not limited to row length, alley length, rows per plot, trip distance, target time, and the number of cells on a seed plate. Based upon the inputted plot characteristics 46 the controller calculates the rotational speed of the motor 24 and in turn the rotational speed of the seed plate 14.

As an operator begins to plant the distance measuring device 26 trips sensor 32 sending a signal to the controller 34 that in turn sends a signal activating the row planters 12. Sensor 32 also sends a signal to the controller with information, such as the rotational speed of a tire or pulley, sufficient for the controller to calculate ground speed.

As the planter traverses the ground, the controller 34 adjusts the speed of the seed plate 14 based upon the inputted plot characteristics 46, the sensed ground speed, the sensed distance traveled, and the acceleration and deceleration of the seed plate 14. By adjusting the rotational speed of the seed plate 14 greater accuracy is achieved with regard to the start point and stop point of the seed group resulting in greater precision of the row and alley length.

In addition to controlling the rotational speed of the seed plate 14 the controller 34 senses and controls other operational features of the planter 10. For example, a sensor 48 is positioned to sense the vacuum pressure in the vacuum tube 20 and send a signal to the controller 34. The controller 34 compares the sensed pressure to an inputted and/or desired pressure and in turn sends a signal to a pressure control 50 to either raise or lower the vacuum pressure. As another example, a sensor 52 is positioned adjacent the seed plate 14 to detect when a seed is dropped from the plate. When a seed is dropped the sensor 52 sends a signal to the controller. Based on this signal the controller 34 not only records the number of seeds dropped, but also based on the time difference between each drop determines if there is a double or a skip. In an alternative embodiment, the determination of a double and a skip is based on a distance between each seed drop. When the controller 34 determines there is a skip or a double the controller records the information, displays the information, and/or signals an alarm.

During the planting operation the controller 34 is recording and displaying plot characteristics 46 and operational characteristics related to the planting operation. The controller 34 compares the sensed information with desired or expected characteristics and if the sensed characteristics fall outside an acceptable predetermined range an alarm 54 will be activated. In this manner the controller is able to diagnose a problem.

Upon completion of the planting operation the plot and operational information is capable of display and/or printing for further analysis. Included in this information is an error report file 56. The error report file 56 contains at least a listing of the errors diagnosed by the controller. In addition, in the event of an error that stops the planting operation, the controller 34 is able to track and graphically display the location of different seed packages with the row planters 12.

In an alternative embodiment an operator may wish to field map the planting operation. To field map various test requirements an operator either inputs or downloads various test conditions for different plots. For example, an operator may wish to test difference in the results obtained based upon the number of seeds planted in each row. Based on the field map information, the controller automatically adjusts operational features such as the rotational speed of the seed plate 14 in order to perform the different tests.

Thus, a method of operating a planter has been shown that, at the very least, achieves all of the stated objectives.

What is claimed is:

1. A system for controlling the planting of seed, comprising:
    a planter having a plurality of row planters that include a seed plate with seed cells that is rotatably mounted to a drive shaft of a motor;
    a distance measuring device associated with the planter and configured to sense a speed and distance traveled by the planter;
    a sensor positioned adjacent the seed plate to detect when a seed is dropped from the seed plate; and
    a controller connected to the row planters and the distance measuring device that calculates the speed of travel and distance the planter travels and that controls a rotational speed of the seed plate through the motor, wherein the controller adjusts the rotational speed of the seed plate based upon sensed ground speed, sensed distance travelled, and acceleration and deceleration of the rotational speed of the seed plate.

2. The system of claim 1 wherein plot characteristics are input to calibrate the planter.

3. The system of claim 1 wherein the controller calculates the rotational speed of the seed plate based upon inputted plot characteristics.

4. The system of claim 1 further comprising a vacuum tube and a sensor positioned to sense vacuum pressure in the vacuum tube.

5. The system of claim 4 wherein the controller sends a signal to a pressure control to adjust vacuum pressure based on a comparison of sensed vacuum pressure and input vacuum pressure.

6. The system of claim 1 wherein the controller records and displays plot characteristics and operating characteristics related to a planting operation.

7. The system of claim 1 wherein an alarm is activated when sensed information is compared to expected characteristics by the controller and the sensed characteristics fall outside of a predetermined range.

8. The system of claim 1 wherein the controller automatically adjusts the rotational speed of the seed plate based upon different tests.

9. The system of claim 1 wherein the controller records the number of seeds dropped and based on a time difference between each seed drop determines if there are doubles and skips.

* * * * *